United States Patent [19]

Kusano et al.

[11] Patent Number: 4,908,392
[45] Date of Patent: Mar. 13, 1990

[54] PROCESS FOR PRODUCING CROSSLINKED POLYMER PARTICLES

[75] Inventors: Hiroshi Kusano; Hideaki Kiniwa, both of Yokohama; Akihiro Shimura, Machida; Masahiko Annaka, Mitaka, all of Japan

[73] Assignee: Mitsubishi Kasei Corporation, Tokyo, Japan

[21] Appl. No.: 329,289

[22] Filed: Mar. 27, 1989

Related U.S. Application Data

[63] Continuation of Ser. No. 181,575, Apr. 14, 1988.

[30] Foreign Application Priority Data

Apr. 22, 1987 [JP] Japan ................... 62-99524

[51] Int. Cl.[4] ................. C08J 9/00
[52] U.S. Cl. ................. 521/60; 521/53; 521/56; 521/57; 521/59; 521/146; 521/149; 521/150; 525/242; 525/286; 525/293; 525/304
[58] Field of Search ............ 521/53, 56, 57, 59, 521/60, 146, 149, 150

[56] References Cited

U.S. PATENT DOCUMENTS

| | | | |
|---|---|---|---|
| 3,743,611 | 7/1973 | Muroi et al. | 521/60 |
| 4,368,218 | 1/1983 | Senda | 521/60 |
| 4,433,029 | 2/1984 | Senda | 521/60 |
| 4,622,346 | 11/1986 | Di Guilio et al. | 521/60 |
| 4,626,554 | 12/1986 | Di Guilio | 521/60 |
| 4,652,609 | 3/1987 | Di Guilio | 521/60 |
| 4,659,600 | 4/1987 | Di Guilio | 521/60 |
| 4,659,745 | 4/1987 | Di Guilio | 521/60 |
| 4,661,386 | 4/1987 | Di Guilio | 521/60 |
| 4,661,564 | 4/1987 | Di Guilio | 521/60 |
| 4,663,357 | 5/1987 | Meyer | 521/60 |

*Primary Examiner*—Morton Foelak
*Attorney, Agent, or Firm*—Oblon, Spivak, McClelland, Maier & Neustadt

[57] ABSTRACT

A process for producing crosslinked polymer particles which comprises a first step of polymerizing a polymerizable monomer containing from 0.1 to 2.0% by weight, based on the entire polymerizable monomer, of a crosslinkable monomer in a medium in which the polymerizable monomer is soluble but the resulting polymer is insoluble, to obtain crosslinked polymer particles having a particle size of from 0.8 to 10 μm, and a second step of letting the crosslinked polymer particles absorb from 1 to 50 times by weight of a polymerizable monomer containing from 2 to 100% by weight, based on the entire polymerizable monomer, of a crosslinkable monomer in an aqueous medium, followed by polymerization to obtain crosslinked polymer particles having a particle size of from 1 to 30 μm and a crosslinking degree of from 1.0 to 98%.

23 Claims, No Drawings

PROCESS FOR PRODUCING CROSSLINKED POLYMER PARTICLES

This is a continuation of application Ser. No. 07/181,575, filed April 14, 1988.

The present invention relates to a process for producing crosslinked polymer particles. More particularly, it relates to a process for producing crosslinked polymer particles having a narrow particle size distribution within a particle size range of from 1 to 30 μm.

Polymer particles having a particle size of about 10 μm are in strong demand in wide range of industrial fields. However, their production is usually not easy.

For the production of conventional polymer particles, suspension polymerization, emulsion polymerization and dispersion polymerization are known. In the suspension polymerization, polymerization is conducted by suspending monomer oil drops in aqueous medium by mechanical force to produce polymer particles. The particles obtained by such a method usually have particle size of at least 100 μm, and it is extremely difficult to obtain polymer particles having particle size of about 10 μm. Besides, the particle size distribution of the polymer particles obtained by dispersing the monomer oil drops by a mechanical force will naturally be wide, whereby a classification of particles will be required, such being disadvantageous. The yield tends to be poor if it is attempted to obtain polymer particles having a narrower particle size distribution.

On the other hand, in the emulsion polymerization wherein a surface active agent is used for emulsification and dispersion, it is possible to obtain polymer particles having a very narrow particle size distribution. However, the particle size of the polymer particles usually obtained is at most 1 μm, and it is practically impossible to obtain polymer particles having a particle size of about 10 μm.

In the dispersion polymerization wherein polymerization is carried out in a medium in which the polymerizable monomer is soluble but the resulting polymer is insoluble, it is extremely difficult to obtain particles having high crosslinking degree at a level of 2.0% or higher, since coagulation of the particles is likely to take place. Further, this method has a drawback such that the particle size distribution tends to be wide if it is attempted to obtain particles having a particle size of 10 μm or larger.

In addition to the above methods, seeded polymerization is known, for which active studies have been made in recent years.

In this method, a polymerizable monomer is absorbed in polymer particles (hereinafter referred to as "seed polymer") obtained by emulsion polymerization, followed by polymerization to obtain enlarged polymer particles. However, the following drawbacks have been pointed out with this method. Namely, the size of particles obtained by emulsion polymerization is very small, and in order to enlarge them to a size of at least 1 μm, the seed polymer must be a non-crosslinked linear polymer. If the seed polymer is crosslinked, the degree of enlargement will be restricted, and it will be extremely difficult to enlarge the particles to a size of about 10 μm. Japanese Unexamined Patent Publication No. 97582/1979 discloses that by adding a chain transfer agent during emulsion polymerization, a linear polymer having a molecular weight substantially lower than a usual polymer latex is prepared, and this polymer is used as a seed polymer so that a polymerizable monomer slightly soluble in water is absorbed by this seed polymer, followed by polymerization. However, in this method, there is a limitation in the size of the polymer particles obtained. Further, when a commonly employed oil soluble polymerization initiator or water soluble polymerization initiator is employed, there will be a problem such as coagulation or formation of new particles, whereby it will be difficult to obtain polymer particles certainly in good yield.

Further, Japanese Unexamined Patent Publication No. 126,288/1979 discloses a method wherein in the first step of the polymerization, a seed polymer is permitted to absorb an organic compound having a solubility of less than $10^{-2}$ g/liter ($10^{-3}$% by weight) to water, which serves as a swelling aid, and in the second step, the seed polymer is permitted to absorb a monomer slightly soluble in water usually in an amount of from 20 to 300 times, at the maximum 1,000 times, by volume relative to the seed polymer, to form swelled monomer particles, followed by polymerization while maintaining the particle form.

However, in this method, the amount of the swelling aid absorbed to the seed polymer is small, and the absorption of the polymerizable monomer can not be so high. Accordingly, this method has a difficulty that the enlargement of polymer particles can not adequately be accomplished. Namely, the size of the polymer particles obtained in the first step is at best about 10 times the size of the seed polymer. Accordingly, if polymer particles having a size of 10 μm are to be prepared by using a seed polymer having a size of 0.5 μm, it is necessary to conduct polymerization firstly by using the seed polymer of 0.5 μm to obtain polymer particles having a size of about 3 μm and then to repeat the same polymerization step by using the polymer particles as a seed polymer. Thus, this method has drawbacks that it involves a number of steps, and the production is not easy.

On the other hand, Japanese Unexamined Patent Publication No. 190,504/1986 discloses a method of enlarging linear polymer particles at least 1,000 times by volume to overcome the above-mentioned drawbacks. In this method, in order to efficiently conduct the englargement, firstly the seed polymer is permitted to absorb a swelling aid, an organic compound having a solubility of not more than 0.02% by weight to water and a molecular weight of not higher than 5,000, and then permitted to absorb a polymerizable monomer, followed by polymerization. However, this method has a difficulty that it takes 66 hours merely to absorb the swelling aid.

In each of the above seeded polymerization methods, the seed polymer is extremely enlarged, and the properties of the polymer used as seed polymer can not adequately be reflected in the nature of the enlarged polymer particles finally obtained. Further, in such methods, it is necessary to extract and remove the linear polymer used as seeds, whereby the polymer particles finally obtained tend to be porous, and it is difficult to produce gel type polymer particles.

The problems involved in the above-mentioned conventional techniques may be summarized as follows.

(a) In the suspension polymerization, the particle size distribution is wide, and it is difficult to obtain polymer partices having a uniform particle size.

(b) In the emulsion polymerization, it is difficult to obtain polymer particles having a particle size of at least 1 μm.

(c) In the dispersion polymerization, it is difficult to obtain polymer particles having a high crosslinking degree.

(d) In the seeded polymerization, it is necessary to extremely enlarge a seed polymer obtained by emulsion polymerization, whereby it is necessary to use a certain sepecial type of a swelling aid. Further, there is a limitation in the process such that it requires a long period of time for the enlarging step.

It is an object of the present invention to overcome the above-mentioned drawbacks of the conventional techniques and to provide a process for producing polymer particles having an optional crosslinking degree within a range of from 2.0 to 98% and an optional particle size within a range of from 1 to 30 μm, and which has a narrow particle size distribution.

Under these circumstances, the present inventors have conducted various studies to obtain polymer particles having a high uniformity coefficient, particularly particles of from 1 to 30 μm suitable as separation media, based on the dispersion polymerization. As a result, they have found it possible to produce particles having an intermediate particle size (1-10 μm) between the particle sizes obtainable by the emulsion polymerization and the subspension polymerization as disclosed in J. Polym. Sci. Polym. Chem. Ed., 24, 2955, (1987). Thus, it has been found that even in the dispersion polymerization whereby it has been considered unnecessary to conduct after polymerization as required by the seeded polymerization for enlargement, it is important to combine such after polymerization for the production of crosslinked particles. Namely, in the case of crosslinked particles, the standard deviation of the particle size distribution of the resulting particles tends to deteriorate and the proportion of deformed polymer increases as the particle size increases, also when particles of from 1 to 30 μm are to be obtained by dispersion polymerization.

In the present invention, the particle size of a seed polymer produced in the first step is large, and the degree of enlargment to the desired particle size may be small (i.e. the amount of the monomer impregnated in the second step may be small). In addition, the seed polymer is a crosslinked polymer. By the synergistic effect of these two features, upon absorption of a monomer by the seed polymer in the second step, the stability of polymer particles swelled by the monomer will be substantially higher than the case where the conventional linear polymer is used as the seed polymer, whereby coagulation, fusion or deformation of the particles during the polymerization can be prevented. The present invention has been accomplished on the basis of these discoveries.

The present invention provides a process for producing crosslinked polymer particles which comprises a first step of polymerizing a polymerizable monomer containing from 0.1 to 2.0% by weight, based on the entire polymerizable monomer, of a crosslinkable monomer in a medium in which the polymerizable monomer is soluble but the resulting polymer is insoluble, to obtain crosslinked polymer particles having a particle size of from 0.8 to 10 μm, and a second step of letting the crosslinked polymer particles absorb from 1 to 50 times by weight of a polymerizable monomer containing from 2 to 100% by weight, based on the entire polymerizable monomer, of a crosslinkable monomer in an aqueous medium, followed by polymerization to obtain crosslinked polymer particles having a particle size of from 1 to 30 μm and a crosslinking degree of from 1.0 to 98%.

Now, the present invention will be described in detail with reference to the preferred embodiments.

In the present invention, it is essential to obtain a crosslinked polymer in the first step, which is significant in the present invention.

Namely, the significance of the present invention is evident from the following Table 1 in which the non-crosslinked particles prepared by using styrene monomer are compared with the crosslinked particles prepared in the same manner as in Example 1 by using styrene monomer and divinyl benzene.

TABLE 1

| Formed polymer | | 1st step polymerization (particle size) | 2nd step polymerization (particle size) | Standard deviation of the particle size distribution of the formed polymer | Proportion of deformed polymer |
| --- | --- | --- | --- | --- | --- |
| Non-crosslinked polymer | 1 | Disperson polymerization (3.0 μm) | — | 1.4% | 0% |
| Crosslinked polymer (crosslinking degree: 2.0%) | 2 | Dispersion polymerization (3.0 μm) | — | 25% | 35% |
|  | 3 | Dispersion polymerization (1.2 μm) | Seeded polymerization (3.2 μm) | 1.2% | 0% |

As is evident from the above Table, in the production of non-crosslinked particles, the particles obtained by dispersion polymerization (No. 1 in the Table) are excellent in both the standard deviation of the particle size distribution and the proportion of the deformed polymer in the formed polymer particles, whereby there is no significance in conducting seeded polymerization wherein the polymerization is conducted in two steps. Whereas, in the production of crosslinked polymer, the significance of the seeded polymerization is remarkable.

According to the present invention, in the first step, a polymerizable monomer containing a crosslinkable monomer is polymerized in a medium wherein the polymerizable monomer is soluble but the resulting polymer is insoluble, to obtain crosslinked polymer particles, and in the second step, the crosslinked polymer particles thus obtained are permitted to absorb a polymerizable monomer containing a crosslinkable monomer, followed by polymerization to obtain crosslinked polymer particles.

As the polymerizable monomer useful for the first step of the present invention i.e. for the polymerization of the seed polymer, a common vinyl monomer may be mentioned. Specifically, an aromatic vinyl monomer such as styrene, a halogenated styrene or vinyl benzyl glycidyl ether, an ethylenically unsaturated carboxylic acid such as acrylic acid or methacrylic acid, an ethylenically unsaturated carboxylate such as methyl acrylate, methyl methacrylate, glycidyl acrylate, glycidyl methacrylate, 2-hydroxyethyl acrylate or 2(N,N'-dimethylamino)ethyl methacrylate and an acrylamide may be mentioned.

As the crosslinkable monomer useful for the polymerization of the seed polymer, an aromatic divinyl compound such as divinyl benzene, a diethylenically unsaturated carboxylate such as ethylene glycol dimethacrylate, an aliphatic diolefin compound such as 1,7-octadiene, a conjugated diolefin such as butadiene or isoprene and methylenebisacrylamide may be mentioned.

In the present invention, the crosslinking degree of the seed polymer is usually within a range of from 0.1 to 2.0% by weight, preferably from 0.1 to 1.5% by weight, more preferably from 0.3 to 1.0% by weight.

If the crosslinking degree is less than 0.1%, the product tends to contain a substantial amount of non-crosslinked polymer, whereby the deformation or coagulation is likely to take place during the seed polymerization, such being undesirable. On the other hand, if the crosslinking degree is higher than 2.0%, the deformation or coagulation of particles is likely to take place during the dispersion polymerization, whereby it will be difficult to obtain a spherical seed polymer.

Here, the crosslinking degree means the proportion by weight of the crosslinkable monomer in the entire monomer. However, in the case of glycidyl acrylate or glycidyl methacrylate, a part of such a monomer serves as a crosslinkable monomer, and a suitable seed polymer may be obtained even when the crosslinking degree is less than the above-mentioned range.

In the first step of the present invention, in order to obtain polymer particles having a desired particle size, it is necessary to properly select the solubility parameter of the medium. Namely, there is a tendency that the larger the difference between the solubility parameter of the resulting polymer particles and the solubility parameter represented by $(\Delta E/V)^{\frac{1}{2}}$ where $\Delta E$ is the evaporation heat of the medium to be used and $V$ is the molecular volume thereof, the smaller the particle size of the resulting polymer particles. As the medium to be used in the present invention, a medium having its solubility parameter within a range of from 10.0 to 20.0 $(cal/cm^3)^{\frac{1}{2}}$, preferably from 10.6 to 16.5 $(cal/cm^3)^{\frac{1}{2}}$, may be employed. Specifically, it may be an alcohol such as methanol, ethanol, 2-propanol or 2-methyl-2-propanol, an alcohol having an ether linkage in its molecule such as 2-methoxy-ethanol, an ether such as tetrahydrofuran or dioxane or a mixture of such solvents with water.

In the present invention, in order to moderate an abrupt change of the solubility parameter in the reaction system during the polymerization of the seed polymer, a diluent may be used as the case requires. The amount of such a diluent may vary depending upon the type and the amount of the polymerizable monomer, and the solubility parameter is preferably within a range of from 8.0 to 9.0 $(cal/cm^3)^{\frac{1}{2}}$. Specifically, cyclohexane or xylene may be mentioned.

In the present invention, in order to prevent the coagulation, deformation or fusion of the resulting polymer particles and to increase the dispersion stability of the particles during the polymerization of the seed polymer, it is preferred to employ a dispersion stabilizer. As such a dispersion stabilizer, it is possible to employ synthetic polymer compounds such as various homopolymers, graftpolymers or blockpolymers or natural polymer compounds or their derivatives. Specifically, poly(vinyl pyrrolidone), poly(vinyl methyl ether), poly(ethyleneimine), poly(acrylic acid), copoly(vinyl alcohol-vinyl acetate), ethylcellulose and hydroxypropylcellulose may be mentioned. Further, in order to stabilize the polymerization and improve the dispersion stability during the polymerization of the seed polymer, it is also possible to employ an assisting stabilizer in addition to the above dispersion stabilizer. As such an assisting stabilizer, an anionic surfactant, nonionic surfactant, a quaternary ammonium salt or a long chain alcohol may be employed. Specifically, sodium di(2-ethylhexyl)sulfosuccinate, nonylphenoxypolyethoxyethanol tricaprylylmethylammonium chloride and cetyl alcohol may be mentioned. Further, as a polymerization initiator which may preferably be used for the polymerization of the seed polymer of the present invention, an azopolymerization initiator such as 2,2'-azobisisobutyronitrile, 4,4'-azobis-(4-cyanopentanoic acid), 2,2'-azobis-(2-methylbutyronitrile) or 2,2'-azobis-(2,4-dimethylvaleronitrile) and a peroxide such as benzoyl peroxide, may be mentioned.

For the polymerization of the seed polymer in the present invention, the polymerization temperature is usually from 40° to 90° C., preferably from 60° to 80° C.

For the second step of the present invention i.e. for enlarging the seed polymer, seed polymerization is employed.

As the seed polymer useful for the seed polymerization of the present invention, a crosslinked polymer such as the styrene-type crosslinked polymer or the acryl type crosslinked polymer obtained in the first step may be mentioned.

Such a seed polymer may be used in the form of a dispersion such as an emulsion or suspension.

The particle size of the seed polymer may optionally be selected within a range of at least $\frac{1}{4}$ of the particle size of the desired polymer. Further, it is also possible to use the polymer particles obtained in the present invention as a seed polymer for the subsequent step to obtain polymer particles having a larger size.

In the present invention, it is preferred to impregnate a polymerization initiator to the seed polymer prior to the impregnation of the polymerizable monomer in order to prevent the formation of new particles. In such a case, the polymerization initiator is dissolved in a small amount of a solvent, and the solution is impregnated as oil drops finely dispersed in the aqueous dispersion of the seed polymer. The time for impregnating the polymerization initiator is usually a few hours. The solvent for the polymerization initiator must be the one having no solubility or an extremely low distribution coefficient to the dispersion medium of the seed polymer. Specifically, an aromatic compound such as benzene, toluene or xylene, or a halogenated aliphatic compound such as 1,2-dichloroethane or 1,1',2-trichloroethane may be mentioned.

The polymerization initiator which may preferably be used for the seeded polymerization of the present invention, includes an azo-type polymerization initiator such as 2,2-azobisisobutyronitrile, 4,4'-azobis(4-cyanopentanoic acid), 2,2'-azobis(2-methylbutyronitrile) or 2,2'-azobis(2,4-dimethylvaleronitrile) and a peroxide such as benzoyl peroxide, lauroyl peroxide, octanoyl peroxide or 3,3,5-trimethylhexanoyl peroxide.

The polymerizable monomer which may preferably be used for the seeded polymerization of the present invention, includes an aromatic vinyl monomer such as styrene, a halogenated styrene or vinyl benzyl glycidyl ether, an ethylenically unsaturated carboxylic acid such as acrylic acid or methacrylic acid, and an ethylenically unsaturated carboxylate such as methyl acrylate, methyl methacrylate, glycidyl acrylate, glycidyl methacrylate, 2-hydroxyethyl acrylate or 2(N,N'-dimethylamino)ethyl methacrylate. These polymerizable monomers may be used alone or in combination as a mixture, depending upon the particular purpose.

The crosslinkable monomer which may be used for the seeded polymerization of the present invention, includes an aromatic divinyl compound such as divinyl benzene, a diethylenically unsaturated carboxylate such as ethylene glycol methacrylate, an aliphatic diolefin compound such as 1,7-octadiene and a conjugated diolefin such as butadiene or isoprene.

The crosslinking degree of the charge in the seeded polymerization of the present invention is from 1 to 100%.

Further, it is possible to obtain porous polymer particles by adding a suitable pore-forming solvent to the monomer phase during the seeded polymerization. As the pore-forming solvent, it is preferred to employ an organic solvent having a small ability of swelling the resulting polymer particles. Further, for the preparation of the dispersion, it is preferred to employ a dispersion stabilizer in order to improve the dispersibility. As such a dispersion stabilizer, a known stabilizer may be employed. For example, an anionic surfactant such as sodium dodecylbenzene sulfonate, sodium lauryl sulfate or sodium dialkyl sulfosuccinate may be mentioned. Further, a non-ionic surfactant such as poly(oxyethylene nonyl phenyl ether), poly(ethylene glycol monostearate) or sorbitan monostearate, or a synthetic polymer compound such as poly(vinyl pyrrolidone), poly(ethyleneimine) or a copoly(vinyl alcohol-vinyl acetate), may be used together.

In the present invention, in order to prevent the coagulation, deformation or fusion of the seeded polymer enlarged upon absorption of the (polymerization) initiator and the polymerizable monomer and to increase the dispersion stability of the polymer during the seeded polymerization, it is necessary to use a dispersion stabilizer. As such a dispersion stabilizer, a conventional anionic or nonioic surfactant may be used. Further, such a surfactant may be used in combination with a synthetic polymer compound such as polyvinyl pyrrolidone, polyethyleneimine or a vinyl alcohol-vinyl acetate copolymer.

For the seeded polymerization of the present invention, the polymerization temperature is usually from 40° to 90° C., preferably from 50° to 80° C.

Now, the present invention will be described in further detail with reference to Examples. However, it should be understood that the present invention is by no means restricted by these specific Examples. In these Examples, "%" means "% by weight".

EXAMPLE 1

1.8 g of poly(vinyl pyrrolidone) K-30 (manufactured by Tokyo Kasei Kogyo K.K., average molecular weight: 40,000), 0.5 g of sodium di-2-ethylhexyl sulfosuccinate, 12.5 g of styrene monomer, 0.08 g of divinyl benzene and 0.13 g of 2,2'-azobisisobutyronitrile were dissolved in a solvent mixture comprising 2.5 g of ethanol and 13 g of cyclohexane and polymerized at 70° C. for 8 hours under nitrogen stream. The conversion by this polymerization was 95%. The polymer particles obtained by this polymerization were observed by a scanning electron microscope, whereby they were found to be spherical particles having an extremely high monodisperse nature with a particle size of 2.0 $\mu$m and a standard deviation of 1.0%. By using the particles as the seed polymer, the following opration was conducted.

Firstly, 0.015 g of 2,2'-azobis(2,4-dimethylvaleronitrile), 0.035 g of toluene and $2\times10^{-4}$ g of sodium alkyldiphenyl ether disulfonate "Pelex SS-H" (manufactured by Kao Corporation) and 1 g of water were mixed, emulsified and finely dispersed so that the particle size of oil drops became at most 0.5 $\mu$m. This dispersion was added to an aqueous dispersion prepared by emulsifying 1 g of the mono disperse polystyrene having a crosslinking degree of 0.6% and a particle size of 2.0 $\mu$m obtained in the previous polymerization, 0.01 g of sodium alkyldiphenyl ether solfonate "Pelex SS-H" and 9 g of water. The mixture was slowly stirred at room temperature for two hours to let the seed polymer absorb the dispersed oil drops containing the polymerization initiator.

Then, the aqueous dispersion of this seed polymer was added to 48 g of a 0.1% aqueous solution of sodium alkyldiphenyl ether sulfonate "Pelex SS-H". Further, 3.5 g of styrene and 1.3 g of divinyl benzene were added thereto, and the mixture was slowly stirred at 30° C. for one hour to let the seeds polymer absorb the monomer, followed by polymerization at 60° C. for 7 hours and at 70° C. for one hour.

The polymer particles obtained by the above polymerization were observed by a scanning electron microscope, whereby they were found to be spherical particles having an extremely high monodisperse nature with a particle size of 3.0 $\mu$m and a standard deviation of 1.2%. The crosslinking degree of the polymer particles thus obtained was determined by a pyrolysis gas chromatography and found to be 0.9%, which indicates that the seed polmerization proceeded satisfactorily in view of the fact that the conversion by this polymerization was 75%.

EXAMPLE 2

1.8 g of poly(vinyl pyrrolidone) K-30, 0.5 g of sodium di-2-ethylhexyl sulfosuccinate, 5.6 g of styrene monomer, 0.084 g of divinyl benzene and 0.057 g of 2,2'-azobisisobutyronitrile were dissolved in a solvent mixture comprising 74.9 g of ethanol and 17.1 g of cyclohexane and polymerized at 70° C. for 8 hours under a nitrogen gas stream. The conversion by this polymerization was 90%. The polymer particles obtained by this polymerization were observed by a scanning electron microscope, whereby they were found to be spherical particles having an extremely high monodisperse nature with a particle size of 1.2 $\mu$m and a standard deviation of 2.0%. By using these particles as the seed polymer, the following operation was conducted.

Firstly, 0.015 g of 2,2'-azobis(2,4-dimethylvaleronitrile), 0.035 g of toluene, $2\times10^{-4}$ g of sodium alkyldiphenyl ether disulfonate "Pelex SS-H" and 1 g of water were emulsified and finely dispersed so that the particle size of oil drops became at most 0.5 $\mu$m. This dispersion was added to an aqueous dispersion prepared by emulsifying 1 g of the monodisperse polystyrene having a crosslinking degree of 1.5% and a particle size of 1.2 $\mu$m obtained by the previous polymerization, 0.01 g of sodium alkyldiphenyl ether sulfonate "Pelex SS-H" and 9 g of water. The mixture was slowly stirred at room temperature for two hours to let the seed polymer absorb the dispersed oil drops.

Then, the aqueous dispersion of this seed polymer was added to 50 g of a 0.1% aqueous solution of sodium alkyldiphenyl ether sulfonate "Pelex SS-H". Further, 4.4 g of styrene and 0.6 g of divinyl benzene were added thereto, and the mixture was slowly stirred at 30° C. for one hour to let the seed polymer absorb the monomer, followed by polymerization at 60° C. for 7 hours and at 70° C. for one hour.

The polymer particles obtained by the above polymerization were observed by a scanning electron microscope, whereby they were found to be spherical particles having an extremely high monodisperse nature with a particle size of 2 μm and a standard deviation of 2.1%. Further, the crosslinking degree of the polymer particles thus obtained were determined by a pyrolysis gas chromatography and found to be 9.0%. The conversion by this seeded polymerization was 70%.

EXAMPLE 3

1.8 g of poly(vinyl pyrrolidone) K-30, 0.5 g of sodium di-2-ethylhexyl sulfosuccinate, 20 g of styrene monomer, 0.12 g of divinyl benzene and 0.21 g of 2,2'-azobisisobutyronitrile were dissolved in a solvent mixture comprising 35 g of ethanol and 42 g of xylene and polymerized at 70° C. for 8 hours under a nitrogen gas stream. The conversion by this polymerization was 85%. The polymer particles obtained by this polymerization were observed by a scanning electron microscope, whereby they were found to be spherical particles having an extremely high monodisperse nature with a particle size of 6.0 μm and a standard deviation of 2.3%. By using the particles as the seed polymer, the following operation was conducted.

Firstly, 0.015 g of 2,2'-azobis(2,4-dimethylvaleronitrile), 0.035 g of toluene, $2\times10^{-4}$ g of sodium alkyldiphenyl ether disulfonate "Pelex SS-H" and 1 g of water were emulsified and finely dispersed so that the particle size of oil drops became at most 0.5 μm. This dispersion was added to an aqueous dispersion obtained by emulsifying 1 g of the mono disperse polystyrene having a crosslinking degree of 0.6% and a particle size of 6.0 μm obtained by the previous polymerization, 0.01 g of sodium alkyldiphenyl ether sulfonate "Pelex SS-H" and 9 g of water. The mixture was slowly stirred at room temperature for two hours to let the seed polymer absorb the dispersed oil drops.

Then, the aqueous dispersion of this seed polymer was added to 31.6 g of a 0.1% aqueous solution of sodium alkyldiphenyl ether sulfonate "Pelex SS-H". Further, 29.6 g of styrene and 2.0 g of divinyl benzene were added thereto, and the mixture was slowly stirred at 30° C. for one hour to let the seed polymer absorb the monomer. Then, the polymerization was conducted at 60° C. for 7 hours and at 70° C. for one hour.

The polymer particles obtained by the above polymerization were observed by a scanning electron microscope, whereby they were found to be spherical particles having an extremely high monodisperse nature with a particle size of 18 μm and a standard deviation of 2.6%. Further, the crosslinking degree of the polymer particles thus obtained were determined by a pyrolysis gas chromatography and found to be 5.0%. The conversion by this seeded polymerization was 80%.

EXAMPLE 4

1.8 g of poly(vinyl pyrrolidone) K-30, 0.5 g of sodium di-2-ethylhexyl sulfosuccinate, 12.5 g of styrene monomer, 0.08 g of divinyl benzene and 0.13 g of 2,2'-azobisisobutyronitrile were dissolved in a solvent mixture comprising 72.5 g of ethanol and 13 g of cyclohexane and polymerized at 70° C. for 8 hours under a nitrogen gas stream. The conversion by this polymerization was 95%. The polymer particles obtained by this polymerization were observed by a scanning electron microscope, whereby they were found to be spherical particles having an extremely high monodisperse nature with a particle size of 2.0 μm and a standard deviation of 1.0%. By using the particles as the seed polymer, the following operation was conducted.

Firstly, 0.015 g of 2,2'-azobis(2,4-dimethylvaleronitrile), 0.035 g of toluene, $2\times10^{-4}$ g of sodium alkyldiphenyl ether disulfonate "Pelex SS-H" and 1 g of water were emulsified and finely dispersed so that the particle size of oil drops became at most 0.5 μm. This dispersion was added to an aqueous dispersion obtained by emulsifying 1 g of the monodisperse polystyrene having a crosslinking degree of 0.6% and a particle size of 2.0 μm obtained by the previous polymerization, 0.01 g of sodium alkyldiphenyl ether sulfonate "Pelex SS-H" and 9 g of water. The mixture was slowly stirred at room temperature for two hours to let the seed polymer absorb the dispersed oil drops.

Then, the aqueous dispersion of this seed polymer was added to an aqueous solution comprising 0.02 g of polyvinyl pyrrolidone K-30, $8\times10^{-3}$ g of di-2-ethylhexyl sulfosuccinate and 28 g of water. Further, 0.7 g of styrene and 2.1 g of divinyl benzene were added thereto, and the mixture was slowly stirred at 30° C. for one hour to let the seed polymer absorb the monomer. Then, the polymerization was conducted at 60° C. for 7 hours and at 70° C. for one hour.

The polymer particles obtained by the above polymerization were observed by a scanning electron microscope, whereby they were found to be spherical particles having an extremely high monodisperse nature with a particle size of 3.1 μm and a standard deviation of 1.5%. Further, the crosslinking degree of the polymer particles thus obtained were determined by a pyrolysis gas chromatography and found to be 43%. The conversion of this seeded polymerization was 78%.

EXAMPLE 5

1.8 g of poly(vinyl pyrrolidone) K-30, 12.5 g of styrene monomer, 0.08 g of divinyl benzene, 0.13 g of glycidyl methacrylate and 0.13 g of 2,2'-azobisisobutyronitrile were dissolved in a solvent mixture comprising 60 g of ethanol and 25.4 g of cyclohexanone and polymerized at 70° C. for 8 hours under a nitrogen stream. The conversion by this polymerization was 80%. The polymer particles obtained by this polymerization were observed by a scanning electron microscope, whereby they were found to be spherical particles having an extremely high monodisperse nature with a particle size of 4 μm and a standard deviation of 2.8%. By using the particles as the seed polymer, the following operation was conducted.

Firstly, 0.015 g of 2,2'-azobis(2,4-dimethylvaleronitrile), 0.035 g of toluene, $2\times10^{-4}$ g of sodium alkyldiphenyl ether disulfonate "Pelex SS-H" were emulsified and finely dispersed so that the particle size of oil drops became at most 0.5 μm. This dispersion was added to an aqueous dispersion obtained by emulsifying 1 g of the monodisperse copoly(styrene-divinyl benzene-glycidyl methacrylate) having a crosslinking degree of 0.6% and a particle size of 4 μm obtained by the previous polymerization, 0.01 g of sodium alkyldiphenyl ether, disulfonate "Pelex SS-H" and 9 g of water. The mixture was slowly stirred at room temperature for two hours to let the seed polymer absorb the dispersed oil drops.

Then, the aqueous dispersion of this seed polymer was added to an aqueous solution comprising 0.02 g of polyvinyl pyrrolidone K-30, $8 \times 10^{-3}$ g of di-2-ethylhexyl sulfosuccinate and 21 g of water. Further, 1.2 g of styrene and 0.92 g of divinyl benzene were added thereto, and the mixture was slowly stirred at 30° C. for one hour to let the seed polymer absorb the monomer. Then, the polymerization was conducted at 60° C. for 7 hours and at 70° C. for one hour.

The polymer particles obtained by the above polymerization were observed by a scanning electron microscope, whereby they were found to be spherical particles having an extremely high monodisperse nature with a particle size of 5 μm and a standard deviation of 3.0%. Further, the crosslinking degree of the polymer particles thus obtained were determined by a pyrolysis gas chromatography and found to be 24%. The conversion by this seeded polymerization was 83%.

EXAMPLE 6

The polymerization was conducted in the same manner as in Example 5 except that 0.13 g of 2-(N,N'-dimethyl)aminoethyl methacrylate was used instead of glycidyl methacrylate in Example 5.

The particle size of the seed polymer obtained, its standard deviation and the conversion by the polymerization as well as the particle size of the polymer particles enlarged by the seed polymerization, its standard deviation, the conversion by the seed polymerization and the crosslinking degree determined by the pyrolysis gas chromatography are shown in Table 2.

EXAMPLE 7

The polymerization was conducted in the same manner as in Example 5 except that 0.13 g of chloromethyl styrene was used instead of glycidyl methacrylate in Example 5.

The particle size of the seed polymer obtained, its standard deviation and the conversion by the polymerization as well as the particle size of the polymer particles enlarged by the seeded polymerization, its standard deviation, the conversion by the seed polymerization and the crossliking degree determined by the pyrolysis gas chromatography are shown in Table 2.

EXAMPLE 8

The polymerization was conducted in the same manner as in Example 5 except that 0.13 g of vinyl benzyl glycidyl ether was used instead of glycidyl methacrylate in Example 5.

The particle size of the seed polymer obtained, its standard deviation and the conversion by the polymerization as well as the particle size of the polymer particles enlarged by the seeded polymerization, its standard deviation, the conversion by the seeded polymerization and the crosslinking degree determined by the pyrolysis gas chromatography are shown in Table 2.

TABLE 2

| | Example 5 | Example 6 | Example 7 | Example 8 |
|---|---|---|---|---|
| Seeded polymer | | | | |
| Particle size (μm) | 4.0 | 4.0 | 3.4 | 3.4 |
| Standard deviation (%) | 2.8 | 3.0 | 1.0 | 1.5 |
| Conversion (%) | 80 | 80 | 87 | 85 |
| Polymer obtained by the present invention | | | | |
| Particle size (μm) | 5.0 | 4.9 | 4.6 | 4.6 |
| Standard deviation (%) | 3.0 | 3.3 | 1.2 | 1.8 |
| Conversion (%) | 83 | 77 | 85 | 81 |
| Crosslinking degree (%) | 24 | 23 | 25 | 24 |

EXAMPLE 9

1.8 g of poly(vinyl pyrrolidone) K-30, 12.5 g of glycidyl methacrylate, 0.01 g of ethylene glycol dimethacrylate and 0.13 g of 2,2'-azobisisobutyronitrile were dissolved in a solvent mixture comprising 73.0 g of ethanol and 12.5 g of cyclohexane and polymerized at 70° C. for 8 hours under a nitrogen gas stream. The conversion by the polymerization was 98%. The polymer particles obtained by this polymerization were observed by a scanning electron microscope, whereby they were found to be spherical particles having an extremely high monodisperse nature with a particle size of 1.6 μm and a standard deviation of 1.0%. By using the particles as the seed polymer, the following operation was conducted.

Firstly, 0.36 g of 2,2'-azobisisobutyronitrile, 36.6 g of ethylene glycol dimethacrylate, 43.8 g of 1,2-dichloroethane, 0.66 g of sodium dodecylsulfate and 280 g of water were finely dispersed so that the particle size of oil drops became at most 0.5 μm. This emulsion was dropwise added at room temperature over a period of two hours to an aqueous dispersion comprising 5.0 g of the monodisperse copoly(glycidyl methacrylate-ethylene glycol dimethacrylate) having a crosslinking degree of 0.1% and a particle size of 1.6 μm obtained by the previous polymerization, 0.01 g of sodium dodecylsulfate and 124 g of water. The mixture was further slowly stirred at the same temperature for 12 hours to let the seed polymer absorb the oil drops. Then, 30.5 g of a 3% poly(vinyl alcohol) aqueous solution was added thereto, and the polymerization was conducted at 70° C. for 8 hours under a nitrogen gas stream. The final conversion by this polymerization was 93%. The polymer particles thus obtained were porous particles having a specific surface area of 10.50 m²/g as measured by BET method. The polymer particles obtained by this polymerization were observed by a scanning electron microscope, whereby they were found to have an extremely high monodisperse nature with a particle size of 3.2 μm and a standard deviation of 1.9%.

EXAMPLE 10

1.8 g of poly(vinyl pyrrolidone) K-30 (manufactured by Tokyo Kasei K.K., average molecular weight: 40,000), 12.5 g of glycidyl methacrylate, 0.005 g of ethylene glycol dimethacrylate and 0.13 g of 2,2'-azobisisobutyronitrile were dissolved in a solvent mixture comprising 73.0 g of ethanol and 12.5 g of cyclohexane and polymerized at 70° C. for 8 hours under a nitrogen gas stream. The conversion by this polymerization was 98%. The polymer particles obtained by this polymerization were observed by a scanning electron microscope, whereby they were found to be spherical particles having an extremely high monodisperse nature with a particle size of 1.4 μm and a standard deviation of 1.0%. By using the particles as the seed polymer, the following operation was conducted.

Firstly, 0.36 g of 2,2'-azobisisobutyronitrile, 32.9 g of ethylene glycol dimethacrylate, 3.7 g of glycerin monomethacrylate, 43.8 g of 1,2-dichloroethane, 0.66 g of sodium dodecylsulfate and 280 g of water were finely dispersed so that the particle size of oil drops became at most 0.5 μm. This dispersion was dropwise added at room temperature over a period of two hours to an aqueous dispersion comprising 5.0 g of the monodisperse copoly(glycidyl methacrylate-ethylene glycol dimethacrylate) having a crosslinking degree of 0.05% and a particle size of 1.4 μm obtained by the previous polymerization, 0.01 g of sodium dodecylsulfate and 124 g of water. The mixture was further slowly stirred at the same temperature for 12 hours to let the seed polymer absorb the oil drops.

Then, 30.5 g of a 3% poly(vinyl alcohol) aqueous solution was added thereto, and the polymerization was conducted at 70° C. for 8 hours under a nitrogen gas stream to obtain particles with a final conversion by polymerization of 90%.

The polymer particles obtained by this polymerization were observed by a scanning electron microscope, whereby they were found to have an extremely high monodisperse nature with a particle size of 3.2 μm and a standard deviation of 2.0%.

EXAMPLE 11

The polymerization was conducted in the same manner as in Example 4 except that the amount of the divinyl benzene was changed to 0.04 g from 0.08 g in the production of the seed polymer in Example 4, to obtain spherical particles having an extremely high monodisperse nature with a particle size of 2.0 μm and a standard deviation of 1.0%. By using the particles as the seed polymer, the following operation was conducted.

Firstly, 1.6 g of benzoyl peroxide, 158 g of toluene, 105 g of ethylene glycol dimethacrylate, 4.6 g of sodium dodecylsulfate and 2,000 g of water were finely dispersed so that the particle size of oil drops became at most 0.5 μm. 260 g of the dispersion thus obtained was dropwise added at 50° C. over a period of 10 minutes to an aqueous dispersion comprising 1.5 g of the monodisperse copoly(styrene-divinyl benzene) having a crosslinking degree of 0.3% and a particle size of 2.0 μm obtained by the previous polymerization, 0.15 g of sodium dodecylsulfate and 15 g of water. The mixture was further stirred slowly at the same temperature for one hour to let the seed polymer absorb the dispersed oil drops.

Then, 220 g of a 3% poly(vinyl alcohol) aqueous solution was added thereto, and the polymerization was conducted at 80° C. for 8 hours under a nitrogen gas stream. The final conversion by the polymerization was 90%. The particles thereby obtained were porous particles having a specific surface area of 350 m²/g as measured by BET method.

The polymer particles obtained by this polymerization were observed by a scanning electron microscope, whereby they were found to have an extremely high monodisperse nature with a particle size of 4.0 μm and a standard deviation of 2.4%.

EXAMPLE 12

1.8 g of poly(vinyl pyrrolidone) K-30, 30 g of glycidyl methacrylate and 0.3 g of 2,2'-azobisisobutyronitrile were dissolved in 67.9 g of ethanol and polymerized at 70° C. for 8 hours under a nitrogen gas stream. The conversion by this polymerization was 95%. The polymer particles obtained by this polymerization were observed by a scanning electron microscope, whereby they were found to be spherical particles having an extremely high monodisperse nature with a particle size of 2.5 μm and a standard deviation of 2.0%. By using the particles as the seed polymer, the following seeded polymerization was conducted.

Firstly, 0.004 g of 2,2'-azobisisobutyronitrile, 40 g of ethylene glycol dimethacrylate, 40 g of 1,2-dichloroethane, 0.77 g of sodium dodecylsulfate and 320 g of water were finely dispersed so that the particle size of dispersed oil drops became at most 0.5 μm. The dispersion was dropwise added at room temperature over a period of two hours to an aqueous dispersion comprising 5.0 g of the crosslinked poly(glycidyl methacrylate) having a particle size of 2.5 μm obtained by the previous polymerization, 0.01 g of sodium dodecylsulfate and 50 g of water. The mixture was further slowly stirred at the same temperature for 12 hours to let the seed polymer absorb the oil drops.

Then, 166 g of a 3% poly(vinyl alcohol) aqueous solution was added thereto, and the polymerization was conducted at 70° C. for 8 hours under a nitrogen gas stream to obtain porous particles with a final conversion by polymerization of 92%.

The polymer particles obtained by this polymerization were observed by a scanning electron microscope, whereby they were found to have an extremely high monodisperse nature with a particle size of 4.9 μm and a standard deviation of 2.8%.

APPLICATION EXAMPLE 1

10 g of the polymer obtained in Example 1 was poured into 50 g of 1,2-dichloroethane, maintained at a temperature of 80° C. for 5 hours and then collected by filtration. The polymer thus obtained was added to 80 g of 98% sulfuric acid and maintained at a temperature of 80° C. for 8 hours for sulfonation. After completion of the reaction, deionized water was added to bring the sulfuric acid concentration to a level of not higher than 30%, and a 10% $Na_2CO_3$ aqueous solution was added thereto to neutralize the system. Then, 20 g of a 2% NaClO aqueous solution was added thereto, and the mixture was thoroughly stirred and then subjected to filtration. The resin thus obtained was maintained in water at 95° C. for 5 hours to obtain a styrene type cation exchange resin having sulfonic groups quantitatively.

The ion exchange capacity of the ion exchange resin prepared in the above manner was 4.0 meq/g.

By using the styrene type cation exchange resin having sulfonic groups thus prepared, the separation of an amino acid mixture comprising aspartic acid, serine, glutamic acid and glycine was conducted by ion exchange chromatography according to an isoclatic elution method.

The elution times of the respective amino acids were 15 minutes (aspartic acid), 18 minutes (serine), 22.5 minutes (glutamic acid) and 29 minutes (glycine), and thus a chromatogram showing excellent separation performance was obtained.

The ion exchange chromatography apparatus according to the isoclatic elution method was LC-3A system by Shimadzu Corporation. Further, the measuring conditions were as follows.

Measuring Conditions

Column: 4.6 mmID×150 mm
Flow rate: 0.5 mm/ml
Elution: Isoclatic-sodium citrate type buffer
Reaction: Sodium hypochlorite-OPA
Detection: Flourescence method (Ex. 360 nm, Em. 450 nm)
Temperature: 60° C.

APPLICATION EXAMPLE 2

The polymer particles obtained in Example 11, were packed in a column, and the separation of phthalates by reversed phase chromatography according to the isoclatic elution method was conducted.

The elution times of the respective phthalates were 3.6 minutes (dimethyl phthalate), 4.4 minutes (diethyl phthalate) and 8.0 minutes (dibutyl phthalate), and thus a chromatogram showing excellent separation performance was obtained.

The measuring conditions are shown below.

Measuring Conditions

Column: 7.5 mmID×75 mm
Flow rate: 0.8 ml/min
Elution: Isoclatic 65 v/v % acetonitrile aqueous solution
Detection: UC 254 nm
Temperature: 25° C.

According to the present invention, the particle size of the seed polymer obtained in the first step is large, whereby the degree of enlargement in the seed polymerization may be small. Namely, the amount of the polymerizable monomer to be absorbed to the seed polymer may be controlled to a level of not higher than 50 times by volume relative to the seed polymer particles. Accordingly, the impregnation of the polymerization initiator and the polymerizable monomer can be conducted in a substantially shorter period of time than the conventional methods, and yet it is possible to certainly produce crosslinked polymer particles having particularly excellent monodisperse nature. Further, in the present invention, a crosslinked polymer is used as the seed polymer, whereby production of gel-type polymer particles is possible, and besides, in order to form an interpenetrating polymer network system, the same effect can be attained with a lower crosslinking degree than the usual crosslinking degree. Further, it is also possible to increase the physical strength of the particles. Furthermore, as the degree of enlargement of the seed polymer can be reduced, the properties of the seed polymer can be reflected in the enlarged particles.

The polymer particles produced by the process of the present invention are polymer particles having optional crosslinking degree and particle size within the ranges of a crosslinking degree of from 2.0 to 98% and a particle size of from 1 to 30 $\mu$m and having a narrow particle size distribution.

The polymer particles obtained by the process of the present invention are useful in various fields. For example, they may be used as carriers for various chromatographies, as standard samples for microscopic inspection, as model materials for separation, liquid flow, centrifugal separation, difusion measurement and dust study, as carriers for biomedical diagnosis reagents, as carriers for immobilized enzymes, as powder inks, as toners for electrostatic development, as coating materials, as powder lubricants, as modifiers for sensitive agent layers, as spacer materials for protecting microcapsules of a pressure sensitive copying papers, as spacers for liquid crystal cells, as plastic pigments for wall papers, as plastic pigments for adhesives, as binders for ceramics, as base polymer particles for impact resistance resins, or as the plastic pigments for cosmetics.

The resin of the present invention is particularly suitable for use as a carrier for liquid chromatography. For example, it is usuful as a carrier for amino acid analysis as a separating agent for proteins, as a carrier for ion chromatography, or as a carrier for polymer type reversed phase column chromatography.

When the polymer particles obtained by the present invention were used as a carrier for chromatography, they exhibited excellent separating performance by virtue of the uniformity of the particle size.

We claim:

1. A process for producing porous crosslinked polymer particles which comprises a first step of polymerizing a polymerizable monomer containing from 0.1 to 2.0% by weight, based on the entire polymerizable monomer, of a crosslinkable monomer in a medium in which the polymerizable monomer is soluble but the resulting polymer is insoluble, to obtain crosslinked polymer particles having a particle size of from 0.8 to 10 $\mu$m, and a second step of letting the crosslinked polymer particles absorb a pore-forming solvent to impregnate the crosslinked particles and from 1 to 50 times by weight of a polymerizable monomer containing from 2 to 100% by weight, based on the entire polymerizable monomer, of a crosslinkable monomer in an aqueous medium, followed by polymerization to obtain crosslinked polymer particles having a particle size of from 1 to 30 $\mu$m and a crosslinking degree of from 1.0 to 98%.

2. A process for producing porous crosslinked polymer particles which comprises a first step of polymerizing a glycidyl acrylate or glycidyl methacrylate and from 0 to 1.0% by weight, based on the entire polymerizable monomer, of a crosslinkable monomer in a medium in which the polymerizable monomer is soluble but the resulting polymer is insoluble, to obtain crosslinked polymer particles having a particle size of from 0.8 to 10 $\mu$m, and a second step of letting the crosslinked polymer particles absorb a pore-forming solvent to impregnate the crosslinked particles and from 1 to 50 times by weight of a polymerizable monomer containing from 2 to 100% by weight, based on the entire polymerizable monomer, of a crosslinkable monomer in an aqueous medium, followed by polymerization to obtain crosslinked polymer particles having a particle size of from 1 to 30 $\mu$m and a crosslinking degree of from 1.0 to 98%.

3. The process according to claim 1, wherein in the first step, as the polymerizable monomer other than the crosslikable monomer, an aromatic vinyl monomer or an ethylenically unsaturated carboxylate is used.

4. The process according to claim 1, wherein in the first step, as the crosslinkable monomer, an aromatic divinyl compound or a diethylenically unsaturated carboxylate is used.

5. The process according to claim 1, wherein the crosslinked polymer particles produced in the first step have a particle size of from 1 to 5 $\mu$m.

6. The process according to claim 1, wherein in the second step, as the polymerizable monomer other than the crosslikable monomer, an aromatic vinyl monomer or an ethylenically unsaturated carboxylate is used.

7. The process according to claim 1, wherein in the second step, as the crosslinkable monomer, an aromatic divinyl monomer or a diethylenically unsaturated carboxylate is used.

8. The process according to claim 1, wherein the amount of the polymerizable monomer containing the crosslinkable monomer absorbed by the crosslinked polymer particles in the second step is from 1 to 30 times by weight relative to the particles.

9. The process according to claim 1, wherein the amount of the polymerizable monomer containing the crosslinkable monomer abosorbed by the crosslinked polymer particles in the second step is from 1 to 15 times by weight relative to the particles.

10. The process according to claim 1 or 2, wherein the solubility parameter of the medium used in the first step is within a range of from 10.0 to 20.0 $(cal/cm^3)^{\frac{1}{2}}$.

11. The process according to claim 1 or 2, wherein as the medium, a medium having an alcoholic hydroxyl group, a medium having an ether linkage, a medium having an alcoholic hydroxyl group and an ether linkage, a medium belonging to an aliphatic hydrocarbon, a medium belonging to an alicyclic hydrocarbon, a mixture of these media or a mixture of these media with water, is used.

12. The process according to claim 1 or 2, wherein the medium used in the first step contains from 1/10 to $\frac{1}{3}$ time by weight of a diluent having a solubility parameter of from 8.0 to 9.0 $(cal/cm^3)^{\frac{1}{2}}$.

13. The process according to claim 12, wherein the diluent is an aliphatic hydrocarbon, an alicyclic hydrocarbon, an aromatic hydrocarbon or a mixture of these diluents.

14. The process according to claim 1 or 2, wherein in the second step, the crosslinked polymer particles obtained in the first step are used in the form of an emulsion or suspension.

15. The process according to claim 1 or 2, wherein in the second step, a solvent having a polymerization initiator dissolved therein is impregnated to the crosslinked polymer particles, and then the polymerizable monomer is impregrenated to the particles.

16. The process according to claim 1 or 2, wherein in the second step, a polymerizable monomer having a polymerization initiator dissolved therein is impregnated to the crosslinked polymer particles.

17. The process according to claim 15, wherein the solvent for the polymerization initiator is a solvent which is substantially insoluble in the dispersing medium for the polymer particles.

18. The process according to claim 15, wherein in the second step, the solvent for the polymerization initiator is a halogenated aliphatic compound or an aromatic hydrocarbon.

19. The process according to claim 1, wherein in the second step, as the pore-forming solvent to be added in the monomer phase, an aromatic hydrocarbon, an aliphatic hydrocarbon or a halogenated aliphatic hydrocarbon is used.

20. The process according to claim 1 or 2, wherein the crosslinked polymer particles produced in the second step have a crosslinking degree of from 1.0 to 95% and a particle size of from 1 to 20 $\mu$m.

21. The process according to claim 1 or 2, wherein the crosslinked polymer particles produced in the second step have a crosslinking degree of from 1.0 to 95% and a particle size of from 1 to 10 $\mu$m.

22. The process according to claim 1 or 2, wherein the standard deviation of the particle size distribution of the crosslinked polymer particles produced in the second step is from 0 to 10%.

23. The process according to claim 1 or 2, wherein the standard deviation of the particle size distribution of the crosslinked polymer particles produced in the second step is from 1 to 5%.

* * * * *